(12) United States Patent
Lota

(10) Patent No.: US 7,726,527 B2
(45) Date of Patent: Jun. 1, 2010

(54) CENTER CONSOLE HAVING HANG FILE STORAGE

(75) Inventor: Charan Singh Lota, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1083 days.

(21) Appl. No.: 11/347,092

(22) Filed: Feb. 3, 2006

(65) Prior Publication Data

US 2007/0182184 A1 Aug. 9, 2007

(51) Int. Cl.
*B60R 7/00* (2006.01)
*B60R 7/04* (2006.01)

(52) U.S. Cl. ............... 224/275; 224/277; 206/214; 206/425

(58) Field of Classification Search .......... 224/277, 224/537, 545, 546, 555, 556, 571, 275; 312/183–185, 312/293.1–293.3, 193, 222, 271, 294; 248/224.8, 248/225.21, 201; 296/24.34; 220/480, 481; 206/214, 425

See application file for complete search history.

(56) References Cited

U.S. PATENT DOCUMENTS

| | | | |
|---|---|---|---|
| 864,282 A | 8/1907 | Altmyer | |
| 2,708,088 A * | 5/1955 | Steinke | 248/221.12 |
| 2,934,391 A | 4/1960 | Bohnett | |
| 3,156,282 A * | 11/1964 | Bedford, Jr. | 411/103 |
| 3,204,776 A * | 9/1965 | Brown et al. | 211/70.6 |
| 3,396,731 A * | 8/1968 | Peebles | 312/184 |
| 3,563,394 A * | 2/1971 | Joyce | 211/126.5 |
| 4,382,518 A * | 5/1983 | Bondoux | 211/192 |
| 4,549,712 A * | 10/1985 | Simon et al. | 248/224.8 |
| 4,936,454 A * | 6/1990 | Wang | 206/425 |
| 4,966,318 A | 10/1990 | Dutka | 224/42.46 |
| 4,986,589 A | 1/1991 | McNew | 296/37.8 |
| 5,143,331 A * | 9/1992 | Robert | 248/27.1 |
| 5,494,161 A * | 2/1996 | Herbst | 206/425 |
| 5,494,175 A * | 2/1996 | Higdon et al. | 211/46 |
| 5,505,358 A | 4/1996 | Haase | 224/539 |
| 5,687,893 A | 11/1997 | Jacobsmeyer, Jr. | 224/275 |
| 5,819,922 A * | 10/1998 | Martin, Jr. | 206/214 |
| 5,842,570 A * | 12/1998 | Turnbull | 206/425 |
| 6,015,198 A | 1/2000 | Stair | 312/235.1 |
| 6,024,241 A * | 2/2000 | Keillor | 220/529 |
| 6,109,493 A | 8/2000 | Bieri | 224/483 |
| 6,135,549 A | 10/2000 | Demick et al. | 297/188.1 |
| 6,352,157 B1 * | 3/2002 | Srinivasan | 206/425 |
| 6,364,133 B1 * | 4/2002 | Sheng | 211/46 |
| 6,393,788 B1 * | 5/2002 | Flores | 52/365 |
| 6,945,414 B1 * | 9/2005 | Stevens et al. | 211/94.01 |
| 2005/0035618 A1 * | 2/2005 | Toth et al. | 296/24.34 |

* cited by examiner

*Primary Examiner*—Nathan J Newhouse
*Assistant Examiner*—Peter Helvey
(74) *Attorney, Agent, or Firm*—Gifford, Krass, Sprinkle, Anderson & Citkowski, P.C.

(57) ABSTRACT

A center console includes a storage bin and a pair of hook members coupled to respective opposing walls of the bin for supporting hanging files in a substantially upright manner within the bin.

8 Claims, 4 Drawing Sheets

CENTER CONSOLE HAVING HANG FILE STORAGE

BACKGROUND OF THE INVENTION

1. Field of the Invention

The invention relates to center consoles for automotive vehicles. More particularly, the invention relates to a center console having a bin adapted for storing hanging files.

2. Description of the Related Art

Automotive vehicles include center consoles disposed between the front driver and passenger seats. Center consoles typically include pockets, holders and slots for storing various items, such as cups, pens, coins, etc. Center consoles also include bins for storing larger items, such as compact disc jewel boxes, road maps, and sunglasses. The bins are covered by hinged lids that serve as armrests for the front occupants. Conventional bin designs are, however, usually box-shaped and lack dividers or other similar features for organizing the bin's contents. Therefore, it remains desirable to provide an improved center console design with a bin adapted for organizing the items contained therein.

SUMMARY OF THE INVENTION

According to one aspect of the invention, a center console is provided for use in an interior of an automotive vehicle. The center console includes a storage bin and a pair of hook members. The hook members are coupled to respective generally parallel and spaced apart walls of the bin for supporting hanging files in a substantially upright manner within the bin.

According to another aspect of the invention, each hook member includes a channel for receiving end tabs of the hanging files. The channel extends longitudinally between opposite ends of the hook member to allow the hanging file to slide therealong.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
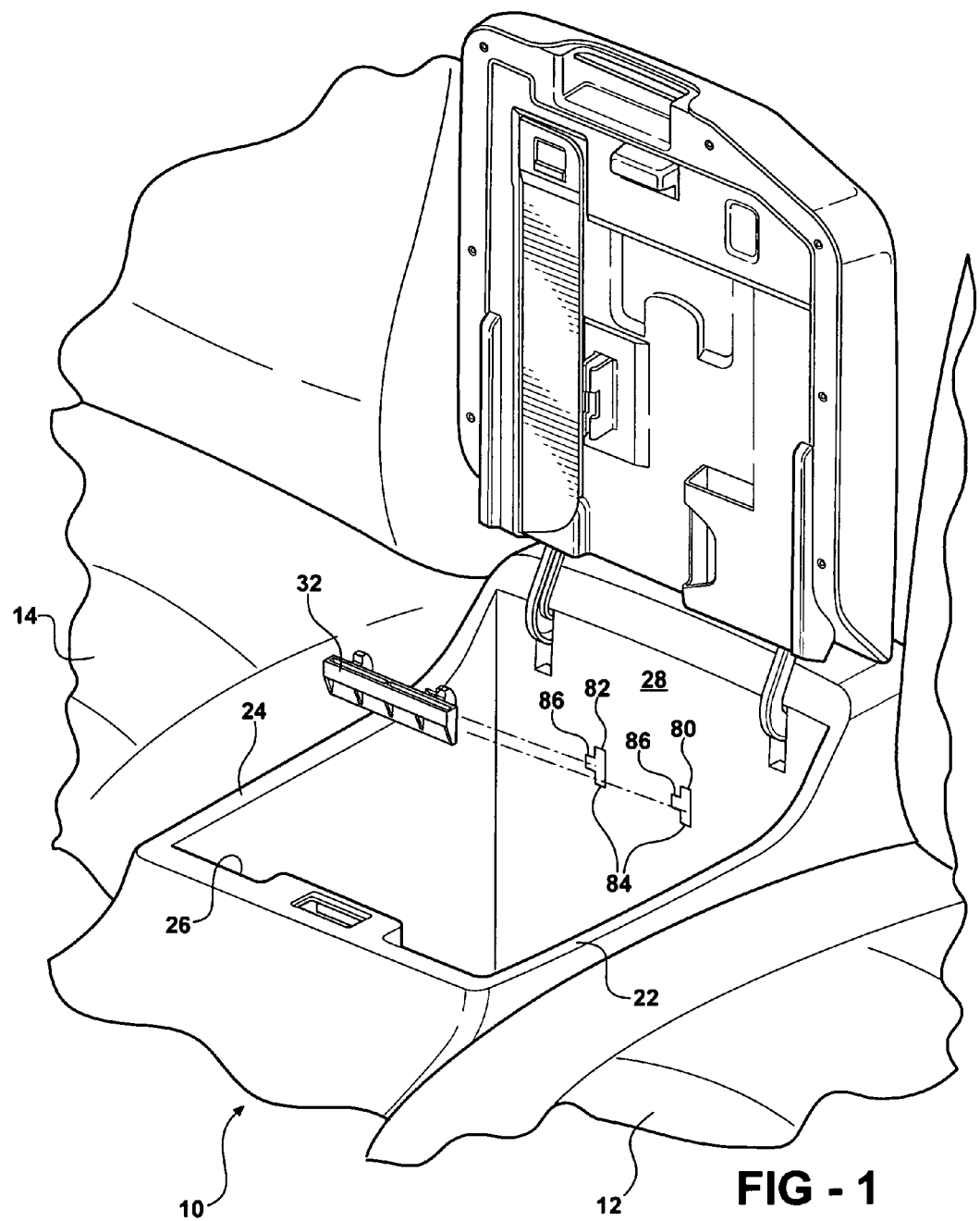
FIG. 1 is a front perspective view of a center console bin with a hook member for supporting hanging files within the bin according to one aspect of the invention, wherein the hook member is shown partially exploded.
Figure 2:
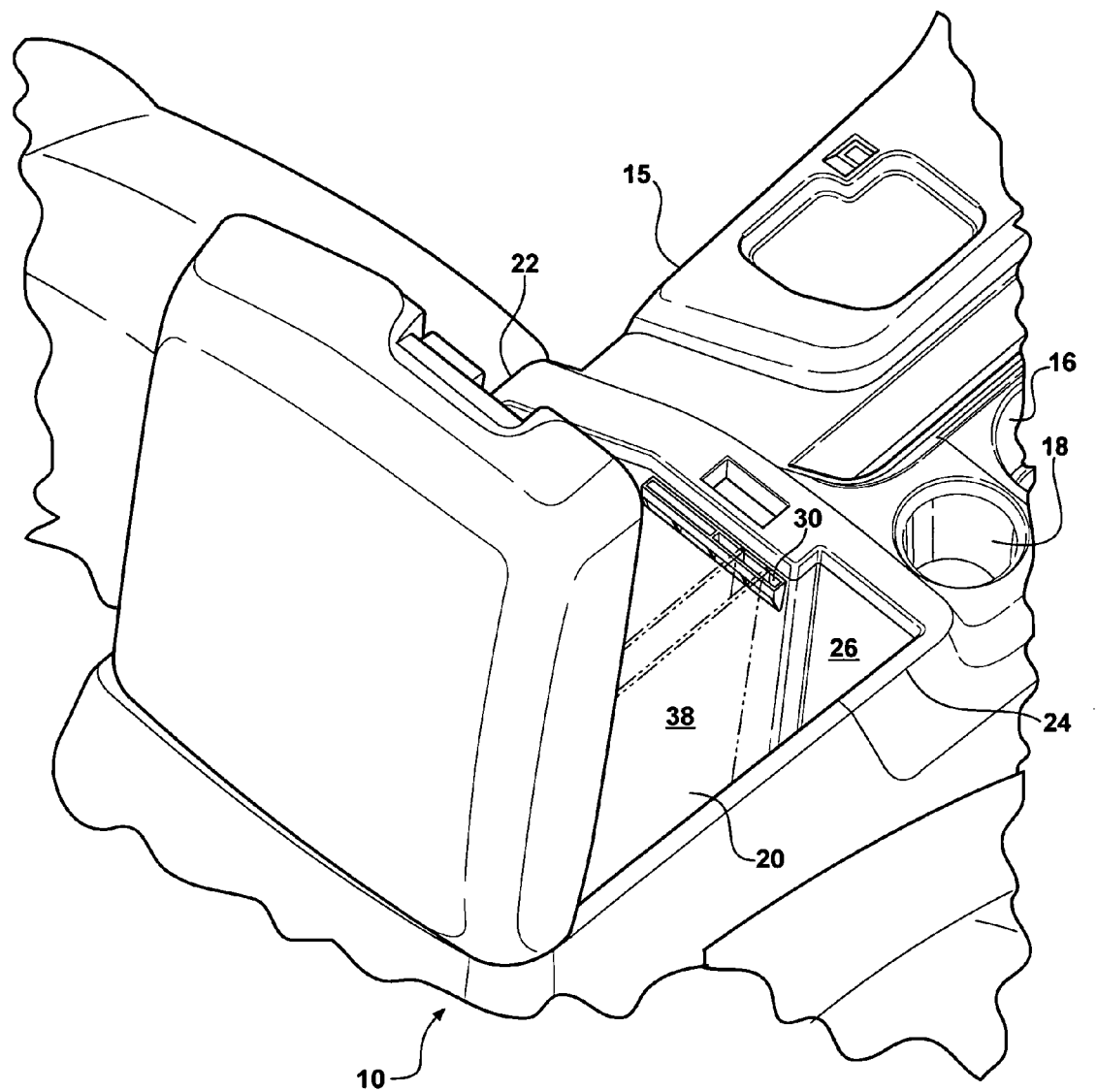
FIG. 2 is a rear perspective view of the center console of FIG. 1, with bin lid in the open position.

Referring to FIGS. 1 and 2, a center console for an automotive vehicle is generally indicated at 10. The console 10 is disposed between front driver 12 and passenger 14 seats. The console 10 includes a main body 15 having a cup holder 16 for supporting beverage containers and a recess 18 for holding miscellaneous small items, such as coins, paper clips, etc. The console 10 also includes a bin 20 for holding larger items, such as CD jewel boxes, books, paper, files and the like. Described in greater detail below, the console 10 can be adapted to support hanging files in an upright manner within the bin 20.

The bin 20 includes generally parallel and spaced apart side walls 22, 24. The bin 20 also includes generally parallel and spaced apart front 26 and rear 28 walls. A pair of hook members 30, 32 are fixedly secured to respective front 26 and rear 28 walls of the bin 20. The hook members 30, 32 are spaced apart vertically from a bottom surface (not shown) of the bin 20. The hook members 30, 32 support end tabs 34, 36 of a hanging file 38 for maintaining the hanging file 38 in a substantially upright manner within the bin 20.

Figure 3:
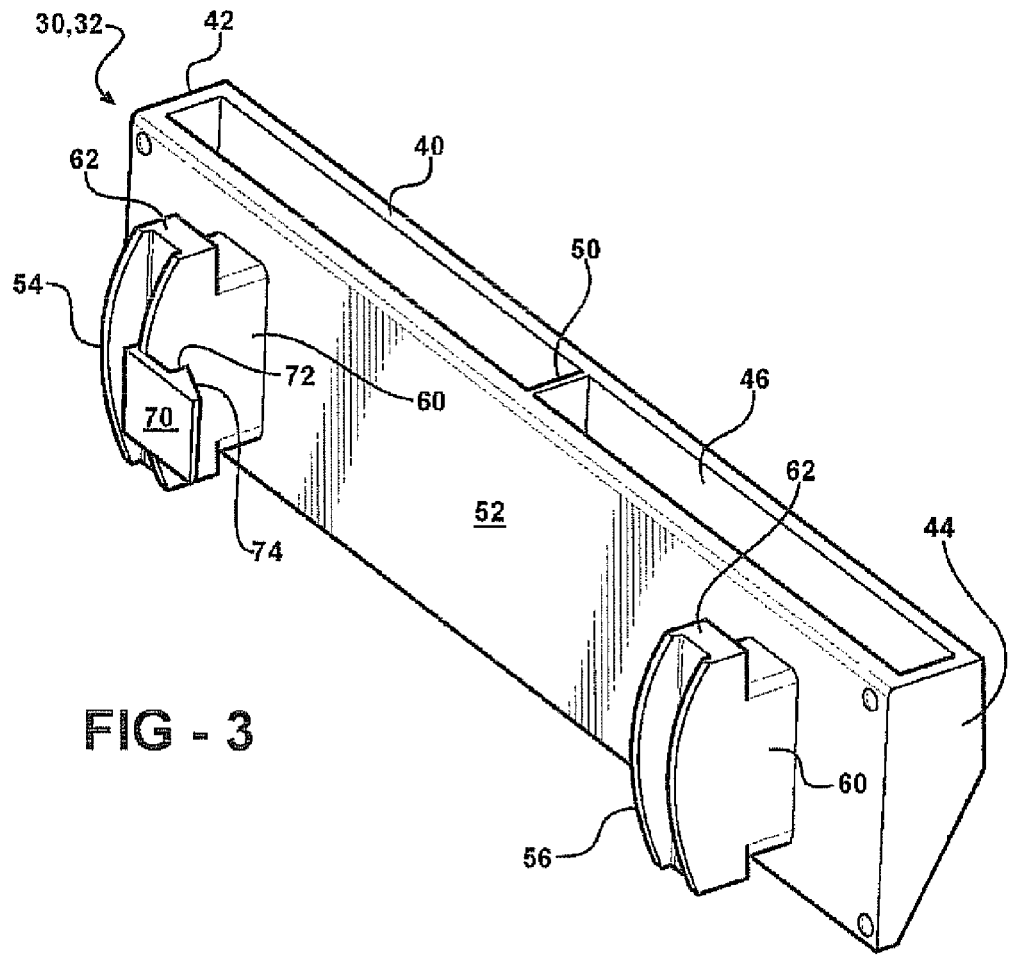
FIG. 3 is a perspective view of the hook member.
Figure 4:
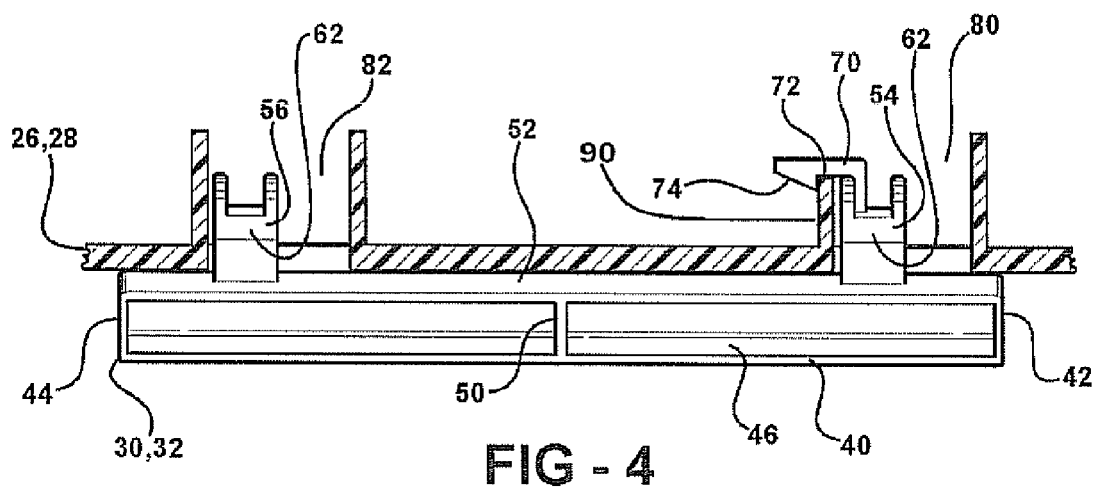
FIG. 4 is a cross sectional view of the hook member.
Figure 5:
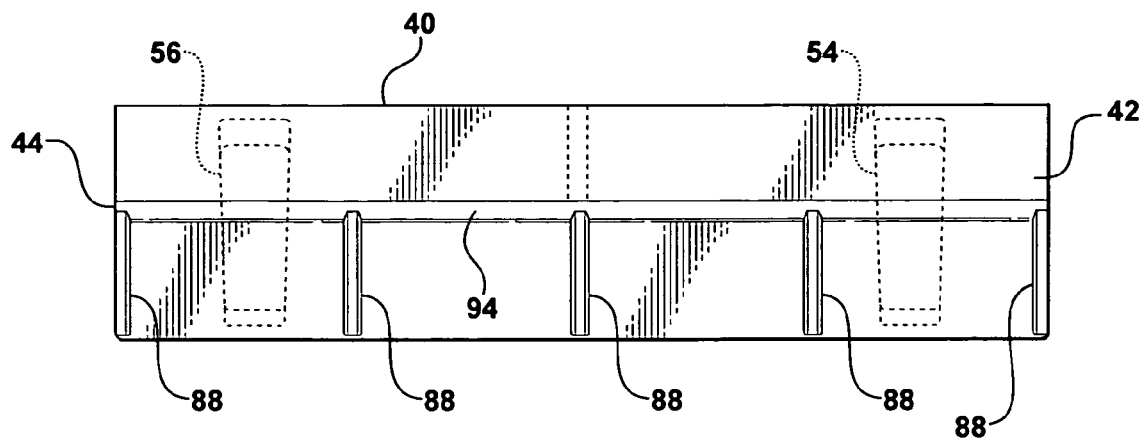
FIG. 5 is a front elevational view of the hook member.
Figure 6:
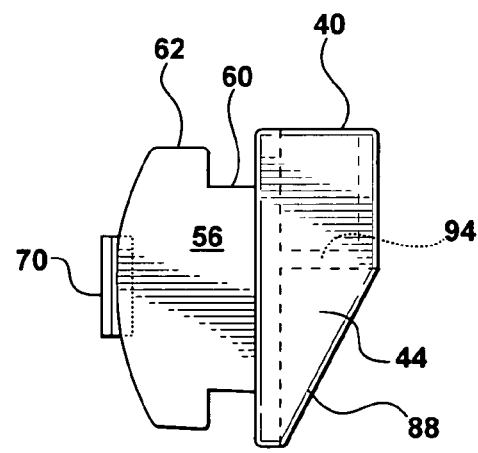
FIG. 6 is a side elevational view of the hook member.

Referring to FIGS. 3-5, the hook member is generally indicated at 30, 32. A top surface 40 extends between opposite ends 42, 44 of the hook member 30, 32. A channel 46 is formed along the top surface 40 for receiving an end tab 34, 36 of the hanging file 38. The channel 46 extends in length between the ends 42, 44 of the hook member 30, 32. The channel 46 has a width corresponding to the width of the end tabs 34, 36, so as to constrain the end tabs 34, 36 of the hanging file 38 in a transverse direction relative to the hook member 30, 32. Optionally, a separator wall 50 divides the length of the channel 46 so that files 38 do not slide along the entire length of the channel 46.

The hook member 30, 32 includes a back surface 52. A pair of tabs 54, 56 extends outwardly from the back surface 52. Each tab 54, 56 is adapted for engaging corresponding slots in the front 26 and rear 28 walls for fixedly securing the hook member 30, 32 to the bin 20. More specifically, each tab 54, 56 includes a base portion 60 and a retaining portion 62 having ends extending outwardly from opposite sides of the base portion 60. One of the tabs 54 includes a retaining member 70 that extends toward the other tab 56 along a direction generally parallel with the back surface 52. The retaining member 70 is generally parallel with and spaced apart from the back surface 52 and includes a retaining edge 72 substantially orthogonal to the back surface 52. A ramped or cam surface 74 extends between the distal end of the tab 54 and the retaining edge 72.

T-shaped slots 80, 82 are formed in the walls 26, 28 of the bin 20. An elongated section 84 of the slots 80, 82 has a length corresponding to the height of the retaining portion 62 so that the tabs 54, 56 can be received therethrough. The slots 80, 82 also have a reduced section 86 with a height corresponding to the height of the base portion 60 of the tabs 54, 56. The reduced section 86 is also smaller than height of the retaining portion 62 of the tabs 54, 56.

The hook members 30, 32 are coupled to the bin 20 by pushing the tabs 54, 56 through respective slots 80, 82 and sliding the hook member 30, 32 along the wall 26, 28 toward the reduced section 86 of the slots 80, 82. The cam surface 74 of the retaining member 70 engages and an end of an abutment wall 90 and displaces the retaining member 70 away from the back surface 52. Once the cam surface 74 moves past the abutment wall 90, the retaining member 70 is allowed to return to its original position, allowing the retaining edge 72 to lockingly engage the abutment wall 90. In this position, the wall 26, 28 is positioned between the retaining portion 62 of the tabs 54, 56 and the back surface 52 of the hook member 30, 32, thereby constraining the hook member 30, 32 in a direction substantially normal to the wall 26, 28. Engagement between the retaining edge 72 and the abutment wall 90 and contact between the base portion 60 of the tabs 54, 56 and edges of the slots 80, 82 constrains the hook member 30, 32 in along a plane substantially parallel with the wall 26, 28. It should be appreciated by those having ordinary skill in the art that the hook members 30, 32 may be secured to the center console using other fixing methods, such as using screws or heat staking.

A middle wall 94 defines the bottom of the channel 46. The middle wall 46 extends longitudinally between the opposite ends 42, 44 of the hook member 30, 32. A plurality of reinforcing ribs 88 extends between the middle wall 94 and a bottom end 96 of the hook member 30, 32.

In use, a hanging file 38 is supported in an upright manner within the bin 20 by placing the end tabs 34, 36 of the hanging file 38 into the channels 46 of the respective hook members 30, 32. The hanging file 38 remains slidable along the channels 46. A plurality of hanging files 38 can be supported by the hook members 30, 32 in an upright manner within the bin 20. It should be appreciated that the hook members 30, 32 can also extend in length between the opposite side walls 22, 24 so that hanging files 38 can supported along the entire length of the front 26 and back 28 walls. It should also be appreciated that the hook members 30, 32 can be secured to the side walls 22, 24 for supporting the hanging files 38 in a transverse direction in the vehicle rather than the fore and aft direction as shown in FIGS. 1 and 2.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

The invention claimed is:

1. A center console for use in an interior of an automotive vehicle operable to hold hanging files in a substantially upright manner, the automotive vehicle having a floor, the center console comprising:

a first wall and a second wall spaced apart, each having inner surfaces, and a pair of opposing side walls also having inner wall surfaces, the pair of opposing side walls extending between the first and second walls, and wherein the first wall, second wall and pair of opposing walls rest on the floor, and wherein the inner wall surfaces of the first, second, and opposing side walls face each other so as to define a storage bin having an opening, and wherein the first and second walls each include a pair of receiving apertures, each of the pair of receiving apertures having an inner peripheral edge, wherein each of the receiving apertures further include an elongated section extending longitudinally between the opening and the floor, and a reduced section extending longitudinally between the pair of opposing side walls, wherein one end of the reduced section is in communication with the mid-portion of the elongated section so as to define a general T shaped receiving aperture; and a pair of hook members, wherein each of the pair of hook members is configured to receive the end tabs of the hanging files and engage respective receiving apertures so as to be mounted along the first and second walls, and wherein each of the pair of hook members includes a back surface and a pair of tabs, wherein the back surface is generally planar and wherein each of the pair of tabs includes a base portion and a pair of retaining portions, the base portion extending generally orthogonal from the back surface and configured to fittingly engage the reduced section, and wherein each of the pair of retaining portions extend generally orthogonal from a distal end of the base portion, and wherein each of the pair of tabs further includes a back portion having a generally convex surface, wherein the convex surface of the back portion is operable to guide the tabs into engagement with the elongated section so as to place the back surface of the hook member in communication with the inner surface of the storage bin, and wherein the hook member may be displaced laterally so as to slide the base portion into fitting engagement with the reduced section so as to fix the pair of hook members into respective first and second walls.

2. A center console as set forth in claim 1, wherein each hook member includes a channel for receiving end tabs of the hanging files, the channel extending longitudinally between opposite ends of the hook member, wherein the hanging files may be moved along the channel.

3. A center console as set forth in claim 2, further including a supporting wall disposed one of the pair of receiving apertures on one of either the first or second wall, the supporting wall extending generally orthogonal from a portion of the inner peripheral edge of the receiving aperture.

4. A center console as set forth in claim 3, further including a retaining member, the retaining member fixedly mounted to one of the pair of tabs, the retaining member having a retaining body, a leg and a head spaced apart and opposite the leg, wherein the leg extends generally orthogonal from one end of the body and is fixedly attached to the back portion of the tab, and wherein the head includes a cam surface and a retaining edge, wherein the cam surface is operable to guide the head portion over a portion of the supporting wall so as to place the retaining edge in engagement with a portion of the supporting wall, wherein the retaining edge biases the portion of the supporting wall so as to constrain the hook member relative to the center console in a direction generally parallel with the back surface.

5. A center console as set forth in claim 4, wherein the elongated section is corresponding in length to the distance between the ends of the retaining portion of the tabs so as to fittingly receive the tab therethrough, and wherein the base portions of the tabs are presented for insertion into the reduced section of the slot after the retaining portion of the tabs have been inserted through the elongated section of the slots, and wherein the retaining member engages the center console to constrain the hook member in a direction generally parallel with the back surface when the base portion of the tab is inserted into the reduced section of the slot.

6. A center console as set forth in claim 2, wherein the hook member includes a wall disposed within the channel to prevent the hanging files from sliding along the full length of the channel.

7. A center console as set forth in claim 6, wherein the hook member includes a middle wall defining the bottom of the channel, the middle wall extending longitudinally between opposite ends of the hook member.

8. A center console as set forth in claim 7, wherein the hook member includes a plurality of ribs extending between the middle wall and a bottom end of the hook member.

* * * * *